(12) United States Patent
Takamatsu

(10) Patent No.: US 6,405,844 B1
(45) Date of Patent: Jun. 18, 2002

(54) WORKING VEHICLE

(75) Inventor: Nobumasa Takamatsu, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/657,249

(22) Filed: Sep. 7, 2000

(30) Foreign Application Priority Data

Sep. 10, 1999 (JP) .......................................... 11-257913

(51) Int. Cl.$^7$ ............................................. B60K 41/22
(52) U.S. Cl. .................. 192/3.26; 192/3.33; 192/103 F
(58) Field of Search ............................... 192/3.21, 3.25, 192/3.26, 3.33, 103 F, 103 R; 180/197

(56) References Cited

U.S. PATENT DOCUMENTS

| | | | |
|---|---|---|---|
| 4,936,405 A | * | 6/1990 | Hrovat ........................ 180/197 |
| 4,942,950 A | * | 7/1990 | Watanabe et al. ........ 180/197 X |
| 5,265,705 A | * | 11/1993 | Takasugi et al. ......... 180/197 X |
| 2001/0025219 A1 | * | 9/2001 | Ohba et al. .................... 701/89 |

FOREIGN PATENT DOCUMENTS

JP 11-230334 * 8/1999

* cited by examiner

*Primary Examiner*—Saul Rodriguez
(74) *Attorney, Agent, or Firm*—Armstrong, Westerman & Hattori, LLP.

(57) ABSTRACT

A working vehicle including a power transmission system capable of surely preventing a slip is provided. For this purpose, the working vehicle is a working vehicle having a modulating clutch (2) which flexibly changes traveling power transmitted from an engine (1) to a torque converter (3), and a controller (8) which controls a degree of engagement of the modulating clutch (2), characterized by including rotational frequency detectors (21, 21) which detect the rotational frequencies of right and left driving wheels (7, 7) of the vehicle, respectively, and characterized in that the controller (8) controls the degree of engagement of the modulating clutch (2) by detecting a sign of a wheel slip based on a difference in the rotational frequency between the right and left driving wheels (7, 7) detected by the rotational frequency detectors (21, 21), to prevent a slip.

3 Claims, 4 Drawing Sheets

WORKING VEHICLE

TECHNICAL FIELD

The present invention relates to a working vehicle which allows variable transmissibility of traveling power which drives driving wheels.

BACKGROUND ART

Conventionally, in a working vehicle such as a construction machine, a power transmission system is known which interposes, between an engine and a torque converter, a modulating clutch flexibly changing a degree of engagement, and makes traveling power transmitted to the torque converter variable. FIG. 4 is a block diagram of a power transmission system disclosed in Japanese Patent Laid-open No. 11-230334, and a prior art will be described hereinafter, based on FIG. 4.

In FIG. 4, power of an engine 1 is distributed to a modulating clutch 2, hydraulic pumps 15 and 16 which drive the modulating clutch 2 and a working machine, respectively. Incidentally, the modulating clutch 2 is a "clutch" in the prior art. Power outputted from the modulating clutch 2 is successively transmitted to a torque converter 3, a transmission 4 and a drive shaft 5 to drive right and left driving wheels 7 and 7 through a differential 6.

The power transmission system is provided with a controller 8 for controlling a degree of engagement of the modulating clutch 2 and changes traveling power transmitted from the engine 1 to the torque converter 3. The drive shaft 5 is provided with a torque detector 9, and the controller 8 detects torque which drives the driving wheels 7 and 7, based on an output signal from the torque detector 9. An operator inputs set torque to the controller 8 from a torque setting dial 13, and the controller 8 controls the degree of engagement of the modulating clutch 2 so that the torque is to be this set value.

A vehicle body 10 of a working vehicle is provided with a vehicle speed detector 11, and the controller 8 detects vehicle speed based on an output signal from the vehicle speed detector 11. An operator inputs set vehicle speed to the controller 8 from a vehicle speed setting dial 14, and the controller 8 controls the degree of engagement of the modulating clutch 2 so that the vehicle speed is to be this set value.

An operator judges how much traveling power is the best according to the working situation and the road condition, based on his or her past working experience and knowledge. Additionally, he or she changes the degree of engagement of the modulating clutch 2 using the aforementioned torque setting dial 13 and the vehicle speed setting dial 14 to prevent a slip of the working vehicle and to improve operation efficiency by retarding vehicle speed of the working vehicle.

However, the above prior art has disadvantages as described below.

In the prior art, an operator judges whether the vehicle is in the slippery condition or not, and manually sets a degree of engagement of the modulating clutch 2 to control traveling power of the working vehicle. Accordingly, when an operator makes an error in this setting due to the immature ability or when an unexpected accident occurs, there is a case in which a slip of a vehicle cannot be surely inhibited simply with the prior art.

For example, setting torque or vehicle speed too high makes traveling power strong, thereby causing the disadvantage that torque driving the driving wheels 7 and 7 becomes too high and a working vehicle slips. Moreover, in working sites, when a working vehicle steps into the place where the soil quality is partially soft as a result of rain, wheels scraping out the ground, or the like, the grip of the driving wheels 7 and 7 suddenly changes, thereby causing the disadvantage that a slip cannot be inhibited simply under the aforesaid control.

SUMMARY OF THE INVENTION

The present invention is made in view of the aforesaid disadvantages, and its object is to provide a working vehicle with a power transmission system which surely prevents a slip of the working vehicle.

A working vehicle according to the present invention is a working vehicle having a modulating clutch which flexibly changes traveling power transmitted from an engine to a torque converter, and a controller which controls a degree of engagement of the modulating clutch, and it includes, rotational frequency detectors which detect rotational frequencies of right and left driving wheels of the vehicle, respectively, and the controller controlling the degree of engagement of the modulating clutch by detecting a sign of a wheel slip based on a difference in the rotational frequency between the right and left driving wheels detected by the rotational frequency detectors, to prevent a slip.

According to the aforementioned structure, a sign of a slip is detected based on the difference in the rotational frequency of the right and left driving wheels, and accordingly the degree of engagement of the modulating clutch is controlled to inhibit a slip. Therefore, a slip is not likely to occur since the controller detects a sign of a slip and automatically weakens the degree of engagement of the modulating clutch. Additionally, even if an operator makes a mistake in operating the modulating clutch, or the working vehicle steps into the place where the soil quality is unexpectedly soft and thereby a slip occurs, the slip can be certainly inhibited since the controller immediately weakens the degree of engagement of the modulating clutch. Accordingly, operation is carried out favorably to improve working efficiency, and at the same time the life of the wheels is lengthened.

Moreover, a working vehicle may be a working vehicle having a modulating clutch which flexibly changes traveling power transmitted from an engine to a torque converter, and a controller which controls a degree of engagement of the modulating clutch so that torque driving right and left driving wheels of the vehicle becomes a predetermined value during operation and it includes, rotational frequency detectors which detect the rotational frequencies of the right and left driving wheels, respectively, and the controller controlling the degree of engagement of the modulating clutch by detecting a sign of a wheel slip based on a difference in the rotational frequency between the right and left driving wheels detected by the rotational frequency detectors, to prevent a slip.

According to the above structure, torque is controlled to be a predetermined value, and a sign of a wheel slip is detected based on the difference in the rotational frequency between the right and left driving wheels, thereby the degree of engagement of the modulating clutch being controlled to inhibit a slip. As a result, torque is controlled in advance so that a slip is not likely to occur, and in addition, even if an operator makes a mistake in setting torque, or the working vehicle steps into the place of soft soil and thereby a slip occurs, the controller detects a sign of a slip and automatically controls the degree of engagement of the modulating clutch. Therefore, since a slip can be certainly inhibited, the operation is carried out favorably to improve working efficiency, and at the same time the life of the wheels is lengthened.

Further, a working vehicle may be a working vehicle having a modulating clutch which flexibly changes traveling power transmitted from an engine to a torque converter, and a controller which controls a degree of engagement of the modulating clutch so that vehicle speed becomes a predetermined value during operation, and it includes, rotational frequency detectors which detect the rotational frequencies of right and left driving wheels of the vehicle, respectively, and the controller controlling the degree of engagement of the modulating clutch by detecting a sign of a wheel slip based on a difference in the rotational frequency between the right and left driving wheels detected by the rotational frequency detectors, to prevent a slip.

According to the aforesaid structure, the control which makes vehicle speed to be a predetermined value is carried out and a sign of a wheel slip is detected based on the difference in the rotational frequency between the right and left driving wheels, thereby the degree of engagement of the modulating clutch being controlled to inhibit a slip. As a result, since the vehicle speed becomes a predetermined value, the working vehicle does not tend to travel too far during an operation such as excavation, and it is possible to carry out the operation efficiently. Additionally, even if a slip begins to occur, it can be certainly inhibited since the controller detects a sign of the slip and automatically controls the degree of engagement of the modulating clutch. Therefore, operation is carried out favorably to improve working efficiency, and at the same time the life of the wheels is lengthened.

Furthermore, a working vehicle may be a working vehicle having a modulating clutch which flexibly changes traveling power transmitted from an engine to a torque converter, and a controller which controls a degree of engagement of the modulating clutch, and it includes, a rotational frequency detector which detects the rotational frequency of either right or left driving wheel of the vehicle, and a shaft rotational frequency detector which detects the rotational frequency of any one of rotating shafts from an output shaft of the torque converter to an input shaft of a differential, and the controller converting the rotational frequency of a rotating shaft detected by the shaft rotational frequency detector to the rotational frequency when transmitted to the right and left driving wheels, and controlling the degree of engagement of the modulating clutch by detecting a sign of a wheel slip based on a difference between the converted rotational frequency and the rotational frequency detected by the rotational frequency detector, to prevent a slip.

According to the above structure, more accurate slip detection is made possible, compared to when detecting a sign of a slip based on the difference in the rotational frequency between the right and left driving wheels. Therefore, a slip can be prevented more certainly.

BEST MODE FOR CARRYING OUT THE INVENTION

Figure 1:
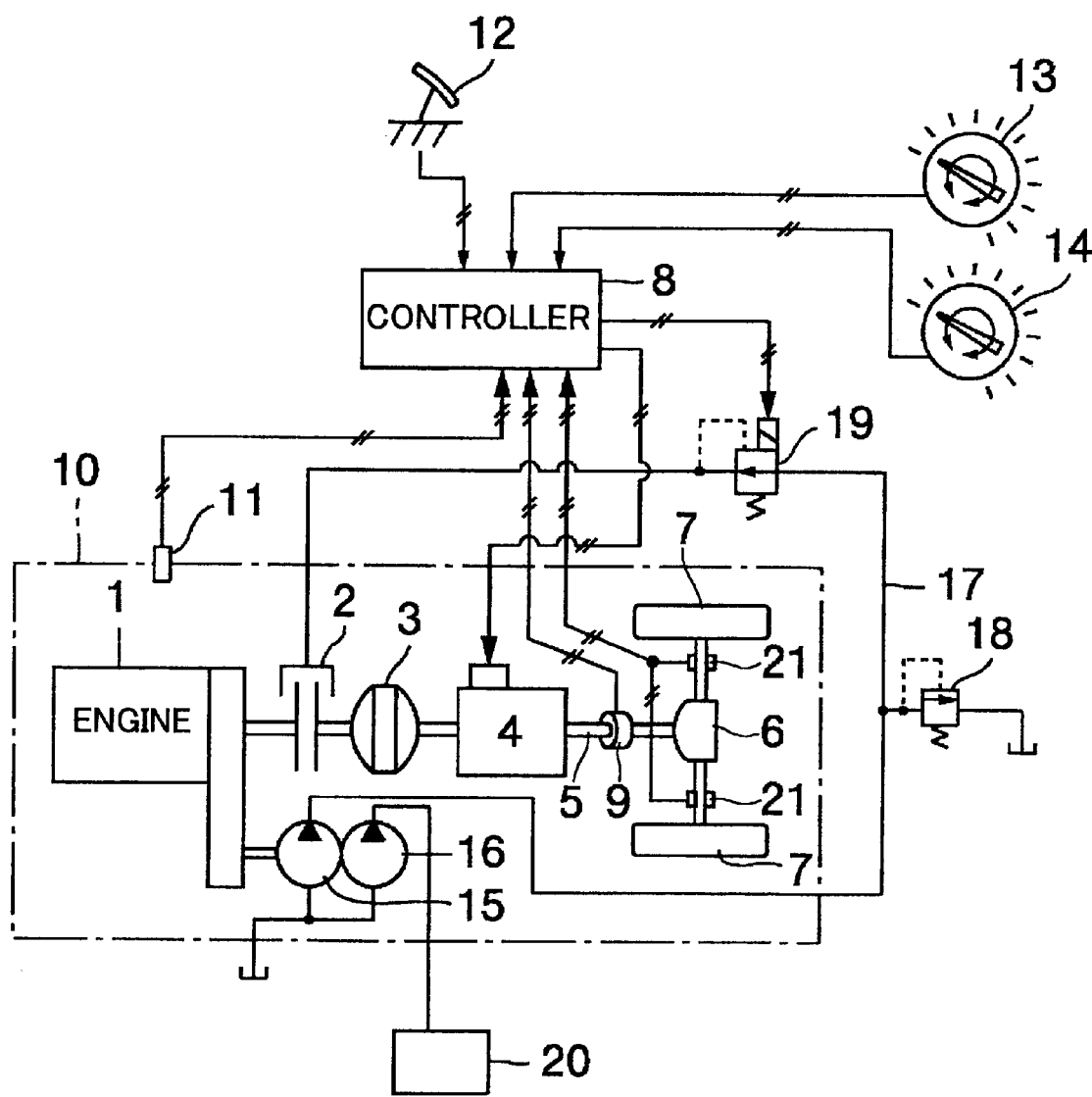
FIG. 1 is a block diagram of a power transmission system in a first embodiment of the present invention.

Embodiments according to the present invention will be described below in detail with reference to the drawings. It should be noted that in the embodiments, the same elements as those of the drawings used in the description of the above-described prior art have the same reference numerals and the repeated description will be omitted.

FIG. 1 is a block diagram of a power transmission system according to a first embodiment. In FIG. 1, power of an engine 1 is distributed to a modulating clutch 2, hydraulic pumps 15 and 16 which drive the modulating clutch 2 and a working machine 20, respectively. Power outputted from the modulating clutch 2 is successively transmitted to a torque converter 3, transmission 4 and a drive shaft 5 to drive driving wheels 7 and 7 through a differential 6.

Additionally, a hydraulic piping 17 which transmits the clutch pressure driving the modulating clutch 2 is connected from the hydraulic pump 15 to the modulating clutch 2. At some point in the hydraulic piping 17, there connected are a relief valve 18 which sets the maximum oil pressure of the clutch pressure, and a proportional solenoid valve 19 which controls the clutch pressure based on inputted current. The proportional solenoid valve 19 is electrically connected to a controller 8 and controls the clutch pressure based on inputted current from the controller 8 to change a degree of engagement of the modulating clutch 2.

Incidentally, since the modulating clutch 2 like this is predicated upon being used in the half-meet state by changing the degree of engagement, it is composed of material which is more resistant to friction than an ordinary clutch for changing gears of a transmission.

On the right and left driving wheels 7 and 7, provided are rotational frequency detectors 21 and 21 which measure the respective rotational frequency. The rotational frequency detectors 21 and 21 are electrically connected to the controller 8 and detect the rotational frequency of each of the right and left driving wheels 7 and 7 to input it to the controller 8.

The drive shaft 5 is provided with a torque detector 9 which detects torque driving the driving wheels 7 and 7 and inputs it to the controller 8. A vehicle body 10 of a working vehicle is provided with a vehicle speed detector 11 which detects vehicle speed of the working vehicle and inputs it to the controller 8.

Additionally, at an operator's feet, provided is a modulating pedal 12 which is also used as a left brake pedal. When an operator does not depress the modulating pedal 12, the modulating clutch is in the engaged state. On the other hand, when an operator depresses the modulating pedal 12, the modulating clutch 2 is completely disengaged, and at the same time the wheel brake operates.

Next, an operation of the present invention will be described, taking an example of the case when loading work is carried out by a wheel loader.

An operator operates a wheel loader and carries out the operation while engaging and disengaging the modulating clutch 2. For example, when excavating or lifting a bucket, modulating pedal 12 is depressed to disengage the modulating clutch 2 so that power of the engine 1 is distributed by a large amount to the working machine 20. Moreover, when carrying loads loaded in the bucket to a truck or the like, the modulating clutch 2 is engaged to be direct-coupled so that power of the engine 1 is distributed by a large amount to the driving wheels 7 and 7.

It is possible for an operator to carry out work by setting torque, which drives the driving wheels 7 and 7, at a predetermined value. In that case, the set torque is inputted from a torque setting dial 13 to the controller 8. The controller 8 judges whether a command from the torque setting dial 13 is effective or not by a switch which is not illustrated, and when effective, it controls a degree of engagement of the modulating clutch 2 based on an input signal from the torque detector 9 so that the torque is to be this set value.

Further, it is possible for an operator to carry out work by setting vehicle speed at a predetermined value. In that case, the set vehicle speed is inputted from a vehicle speed setting dial 14 to the controller 8. The controller judges whether a command from the vehicle speed setting dial 14 is effective or not by a switch which is not illustrated, and when effective, it controls a degree of engagement of the modulating clutch 2 based on an input signal from a vehicle speed detector 11 so that the vehicle speed is to be this set value.

Additionally, the controller 8 calculates a rotational frequency difference $\Delta N$ between the right driving and left driving wheels 7 and 7, based on an input signal from the rotational frequency detectors 21 and 21 to judge whether the vehicle is about to slip or not. Then, when a slip is about to occur, or it has occurred, the degree of engagement of the modulating clutch 2 is weakened to reduce traveling power, thereby inhibiting a wheel slip.

Figure 2:
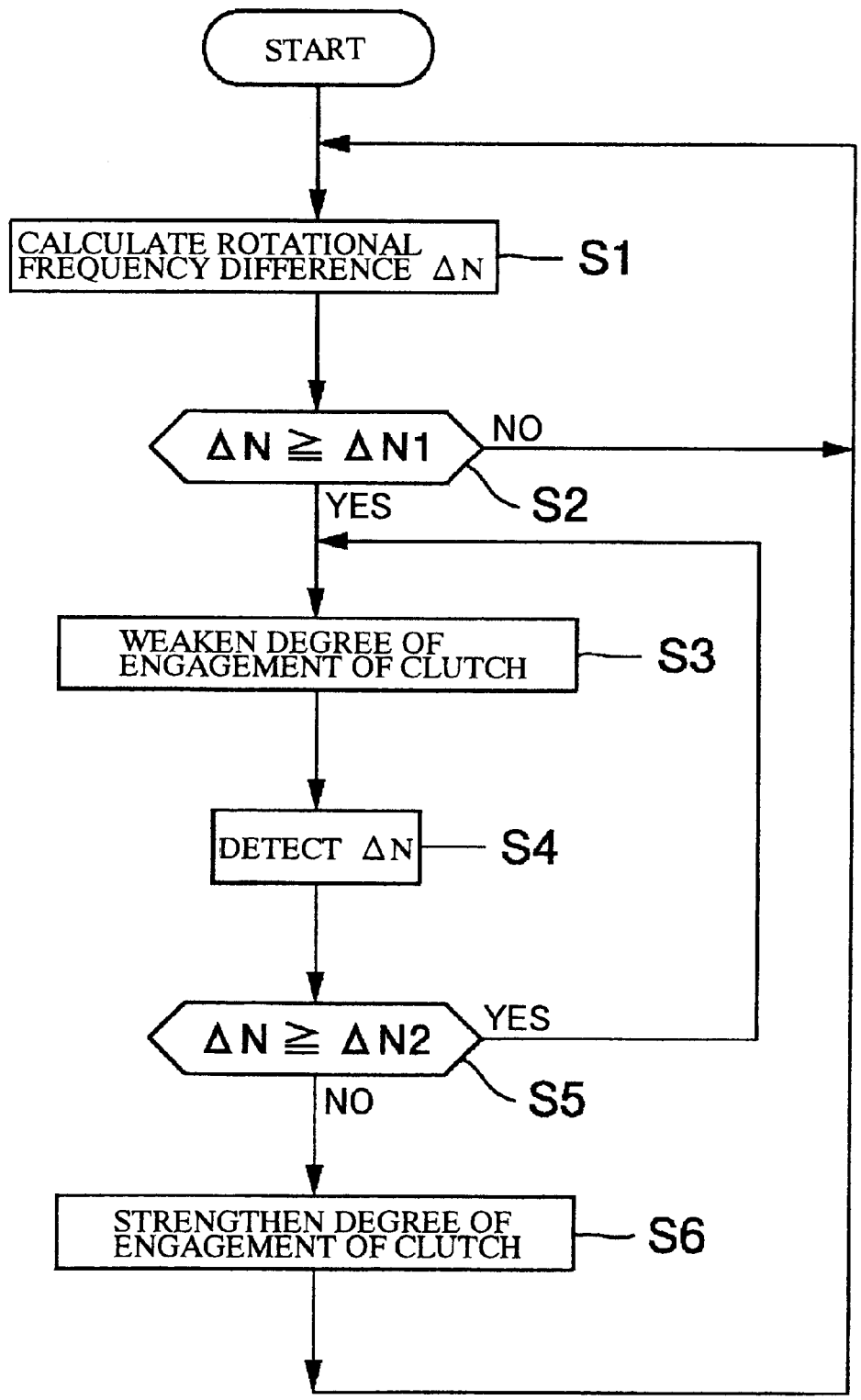
FIG. 2 is a flow chart showing an example of a procedure for performing slip inhibition in the first embodiment.

Next, the procedure for performing slip inhibition will be described according to FIG. 2 showing an example thereof.

After starting an operation, the controller 8 continuously computes a detected signal from the rotational frequency detectors 21 and 21 and calculates the rotational frequency $\Delta N$ between the right and left driving wheels 7 and 7 (step S1).

Subsequently, the controller 8 judges whether the rotational frequency $\Delta N$ becomes not less than a first threshold value $\Delta N1$ or not (step S2), and when the rotational frequency difference $\Delta N$ is less than a first threshold value $\Delta N1$, it judges that a slip does not occur and returns to step S1.

In step S2, when the rotational frequency difference $\Delta N$ is not less than a predetermined value $\Delta N1$, the controller 8 judges that a slip has occurred and outputs a signal to the proportional solenoid valve 19 to weaken the degree of engagement of the modulating clutch 2 from a current degree of engagement by a predetermined proportion (step S3).

Then, the controller 8 again calculates the rotational frequency difference $\Delta N$ between the right and left driving wheels 7 and 7 (step S4), and compares the rotational frequency difference $\Delta N$ with a second threshold value $\Delta N2$ (step S5).

In step S5, when the rotational frequency difference $\Delta N$ is not less than the second threshold value $\Delta N2$, the controller 8 judges that the slip is still keeping and returns to step S3 to weaken the degree of engagement further. On the other hand, when the rotational frequency difference $\Delta N$ is less than the second threshold value $\Delta N2$, the controller 8 judges that the slip is inhibited by recovery of the grip of the driving wheels 7 and 7, strengthens the degree of engagement of the modulating clutch 2 (step S6), and returns to step S1.

As described above, according to the first embodiment, a sign of a wheel slip is detected based on the rotational frequency difference $\Delta N$ between the right and left driving wheels 7 and 7, thereby controlling the degree of engagement of the modulating clutch 2 to inhibit a slip.

As a result, since the controller 8 detects a sign of a slip and automatically weakens the degree of engagement of the modulating clutch 2, a slip is not likely to occur. Moreover, even if a slip occurs, for example, due to a mistake in operating the modulating clutch 2 by an operator, the slip can be inhibited by immediately weakening the degree of engagement of the modulating clutch 2. Therefore, operation is carried out favorably to improve working efficiency, and at the same time the life of the wheels is lengthened.

Further, in a working vehicle in which an operator sets torque by the torque setting dial 13 and the controller 8 controls the degree of engagement of the modulating clutch 2 so that the torque is to be the set value, the degree of engagement of the modulating clutch 2 is controlled by detecting a sign of a wheel slip to inhibit a slip.

Accordingly, a slip is not likely to occur since the torque is controlled in advance, and in addition, the controller 8 automatically controls the degree of engagement of the modulating clutch 2 by detecting a sign of a slip, and thereby a slip is prevented more certainly compared to the case with simple control with torque. Therefore, operation is carried out favorably to improve working efficiency, and at the same time the life of the wheels is lengthened.

Furthermore, in a working vehicle in which an operator sets vehicle speed by the vehicle speed setting dial 14 and the controller 8 controls the degree of engagement of the modulating clutch 2 so that the vehicle speed is to be the set value, the degree of engagement of the modulating clutch 2 is controlled by detecting a sign of a wheel slip to inhibit a slip.

According to the above, the vehicle speed becomes a predetermined value, and thereby the working vehicle does not tend to travel too much during operation such as excavation to make it possible to carry out the operation efficiently. Moreover, since the controller 8 automatically controls the degree of engagement of the modulating clutch 2 by detecting a sign of a slip, a slip can be certainly prevented. Therefore, operation is carried out favorably to improve working efficiency, and at the same time the life of the wheels is lengthened.

Incidentally, it should not be limitedly understood that a degree of engagement of the modulating clutch 2 is weakened from a current degree of engagement by a predetermined proportion in step S3 in FIG. 2. For example, when it is judged that a slip has occurred, a predetermined degree of engagement may be made, or a degree of being weakened may be changed based on the current rotational frequency difference $\Delta N$, regardless of a current degree of engagement.

Next, a second embodiment will be described.

Figure 3:
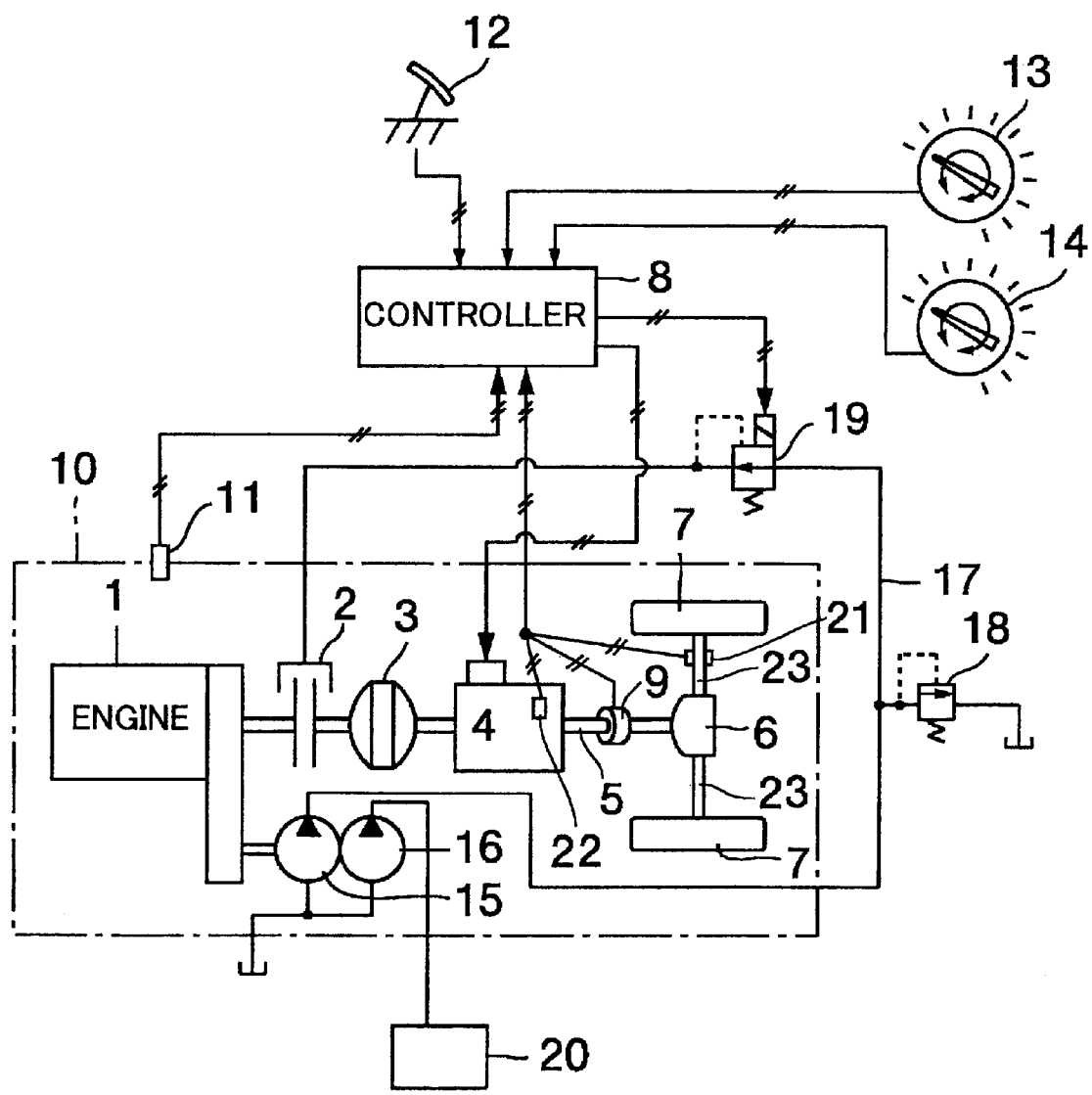
FIG. 3 is a block diagram of a power transmission system in a second embodiment of the present invention.
Figure 4:
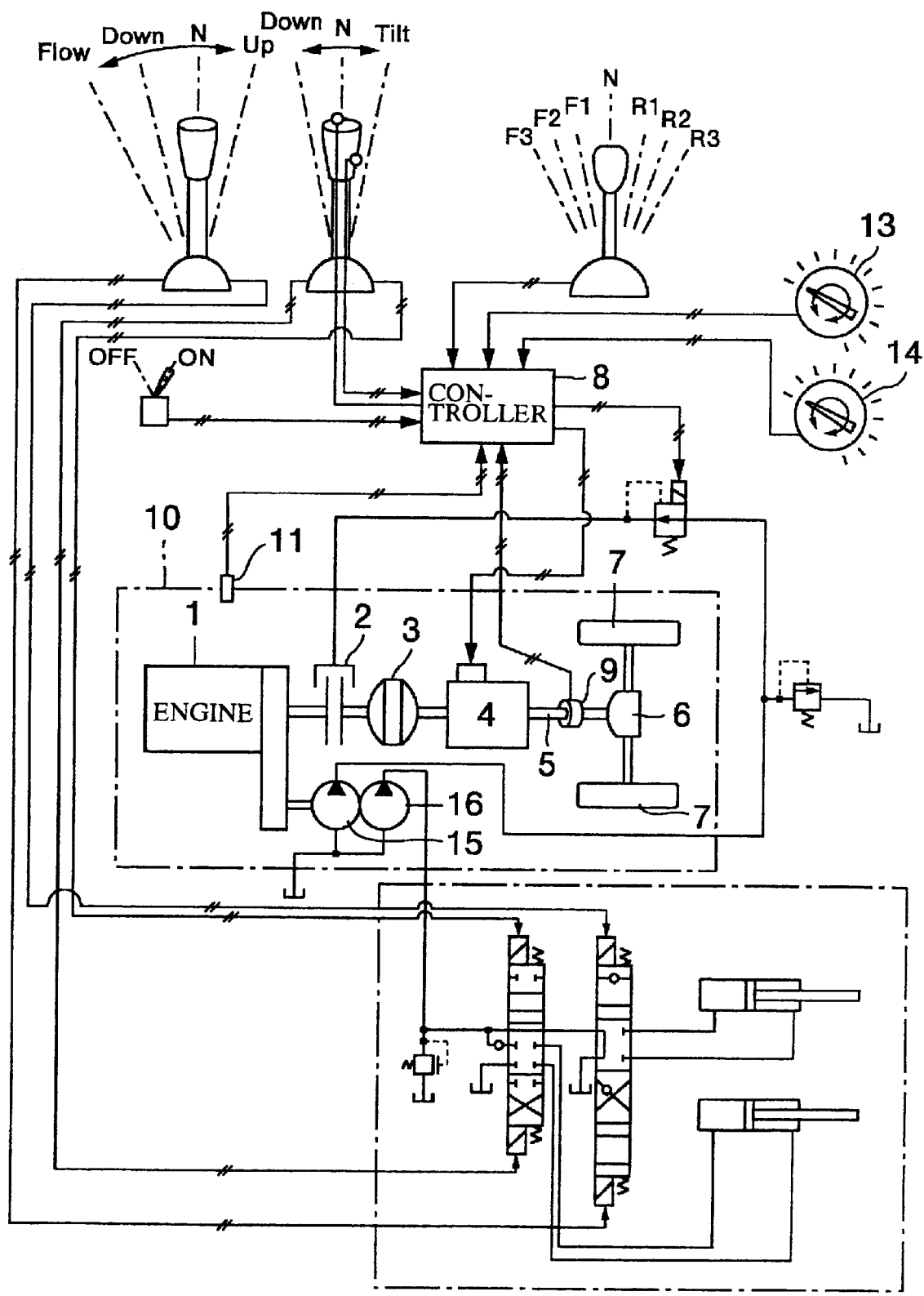
FIG. 4 is a block diagram of a power transmission system in a prior art.

FIG. 3 is a block diagram of a power transmission system according to the second embodiment. In FIG. 3, a differential 6 and right and left driving wheels 7 and 7 are linked by right and left axles 23 and 23. The right or left axle 23 is provided with a rotational frequency detector 21 which measures the rotational frequency of the driving wheel 7. A transmission 4 is provided with a transmission rotational frequency detector 22, an example of a shaft rotational frequency detector 22 which measures the rotational frequency of a drive shaft 5. The rotational frequency detector 21 and the transmission rotational frequency detector 22 are electrically connected to a controller 8, and detect the rotational frequency of the right or left driving wheel 7 and of the drive shaft 5, respectively, to input it to the controller 8.

The controller 8 calculates the rotational frequency of the driving wheel 7 and the rotational frequency of the drive shaft 5, based on an input signal from the rotational frequency detector 21 and the transmission rotational frequency detector 22. The rotational frequency of the drive shaft 5 is multiplied by a predetermined coefficient based on a gear ratio of the differential 6 or the like, and is converted to the conversion rotational frequency when the rotational frequency of the drive shaft 5 is transmitted to the driving wheel 7. Then, the difference in the conversion rotational frequency, which is the difference between this conversion rotational frequency and a measurement value of the rotational frequency of the driving wheel 7, is calculated. When a vehicle does not slip, the above difference in the conversion rotational frequency becomes approximately zero, and on the other hand, the larger the difference in the conversion rotational frequency becomes, the higher a possibility of the vehicle slipping becomes.

The judgment on a slip is the same as that of the flow chart shown in FIG. 2, and when the difference in the conversion rotational frequency, instead of the rotational frequency difference $\Delta N$ is larger than a predetermined value, the judgment is made that a slip is about to occur in step S1 and S2. When a slip is about to occur, or when it has occurred, traveling power is reduced by weakening a degree of engagement of the modulating clutch 2 to inhibit a wheel slip in the same manner as described in the first embodiment.

As described above, according to the second embodiment, the conversion rotational frequency difference between the rotational frequency of either the right or left driving wheel 7 and the conversion rotational frequency calculated from the rotational frequency of the drive shaft 5, is calculated, and the judgment whether a slip is about to occur or not is made based on the difference in the conversion rotational frequency. Since the rotational frequencies of the right and left driving wheels 7 and 7 vary greatly to each other according to the traveling conditions of the vehicle, it is sometimes difficult to detect a slip based on the rotational frequency difference $\Delta N$. On the other hand, variation of the conversion rotational frequency is slight, and thereby it is possible to judge a slip more accurately by adopting the difference between the rotational frequency of either side of the driving wheels 7.

Accordingly, since the degree of engagement of the modulating clutch 2 is adjusted based on the more accurate judgment on a slip like this, a slip is less likely to occur. Therefore, operation is carried out favorably to improve operation efficiency.

Incidentally, it should not be limitedly understood that the transmission rotational frequency detector 22, which detects the rotational frequency of the drive shaft 5, is described as an example of a shaft rotational frequency detector 22 in the above description. That is, a shaft rotational frequency detector 22 may be provided so as to detect the rotational frequency of any one of rotating shafts between an output shaft of a torque converter 3 and an input shaft of the differential 6. At this time, conversion is to be carried out by changing a coefficient for calculating the conversion rotational frequency based on the rotating shaft of which rotational frequency the shaft rotational frequency detector 22 detects as necessary.

What is claimed is:

1. A working vehicle including a modulating clutch (2) which flexibly changes traveling power transmitted from an engine (1) to a torque converter (3), and a controller (8) which controls a degree of engagement of said modulating clutch (2), said working vehicle comprising:

a rotational frequency detector (21) which detects the rotational frequency of either right or left driving wheel (7, 7) of the vehicle, and a shaft rotational frequency detector (22) which detects the rotational frequency of any one of rotating shafts from an output shaft of said torque converter (3) to an input shaft of a differential (6);

wherein said controller (8) converts the rotational frequency of a rotating shaft detected by said shaft rotational frequency detector (22) to the rotational frequency when transmitted to said right and left driving wheels (7, 7), and controls the degree of engagement of said modulating clutch (2) by detecting a sign of a wheel slip based on a difference between said converted rotational frequency and the rotational frequency detected by said rotational frequency detector (21), to prevent a slip.

2. A working vehicle including a modulating clutch (2) which flexibly changes traveling power transmitted from an engine (1) to a torque converter (3), and a controller (8) which controls a degree of engagement of said modulating clutch (2) so that torque driving right and left driving wheels (7, 7) of the vehicle becomes a predetermined value during operation, said working vehicle comprising:

a rotational frequency detector (21) which detects the rotational frequency of either said right or left driving wheel (7, 7), and a shaft rotational frequency detector (22) which detects the rotational frequency of any one of rotating shafts from an output shaft of said torque converter (3) to an input shaft of a differential (6);

wherein said controller (8) converts the rotational frequency of a rotating shaft detected by said shaft rotational frequency detector (22) to the rotational frequency when transmitted to said right and left driving wheels (7, 7), and controls the degree of engagement of said modulating clutch (2) by detecting a sign of a wheel slip based on a difference between said converted rotational frequency and the rotational frequency detected by said rotational frequency detector (21), to prevent a slip.

3. A working vehicle including a modulating clutch (2) which flexibly changes traveling power transmitted from an engine (1) to a torque converter (3), and a controller (8) which controls a degree of engagement of said modulating clutch (2) so that vehicle speed becomes a predetermined value during operation, said working vehicle comprising:

a rotational frequency detector (21) which detects the rotational frequency of either right or left driving wheel (7, 7), and a shaft rotational frequency detector (22) which detects the rotational frequency of any one of rotating shafts from an output shaft of said torque converter (3) to an input shaft of a differential (6);

wherein said controller (8) converts the rotational frequency of a rotating shaft detected by said shaft rotational frequency detector (22) to the rotational frequency when transmitted to said right and left driving wheels (7, 7), and controls the degree of engagement of said modulating clutch (2) by detecting a sign of a wheel slip based on a difference between said converted rotational frequency and the rotational frequency detected by said rotational frequency detector (21), to prevent a slip.

* * * * *